J. P. WOOD.
UNIVERSAL JOINT.
APPLICATION FILED NOV. 8, 1920.
1,381,155. Patented June 14, 1921.
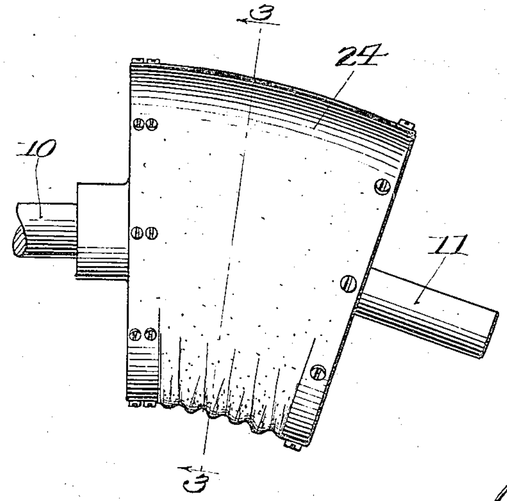
FIG. 1.
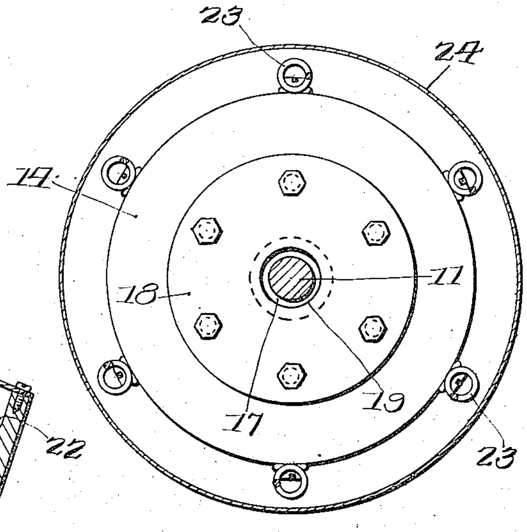
FIG. 3.
FIG. 2.
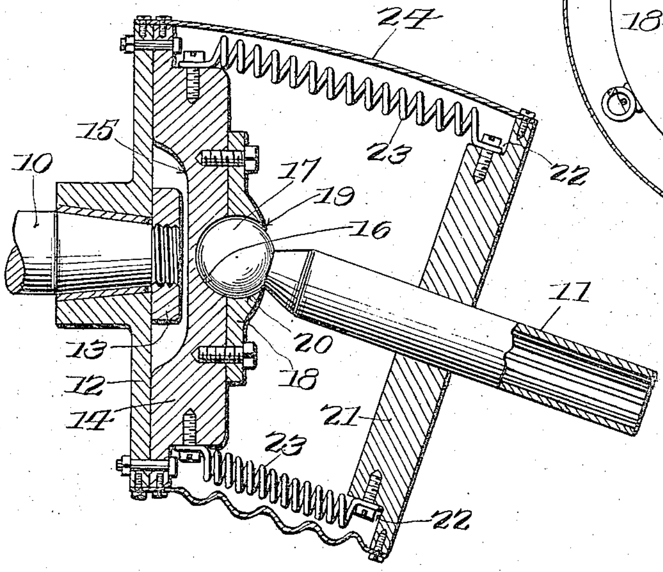
Witness.
James F. FitzGibbon
Joseph P. Wood. INVENTOR.
BY
Chandlee & Chandlee ATTORNEY.

UNITED STATES PATENT OFFICE.

JOSEPH P. WOOD, OF COLUMBUS, GEORGIA.

UNIVERSAL JOINT.

1,381,155. Specification of Letters Patent. Patented June 14, 1921.

Application filed November 8, 1920. Serial No. 422,652.

*To all whom it may concern:*

Be it known that I, JOSEPH P. WOOD, a citizen of the United States, residing at Columbus, in the county of Muscogee, State of Georgia, have invented certain new and useful Improvements in Universal Joints; and I do hereby declare the following to be a full, clear, and exact description of the invention, such as will enable others skilled in the art to which it appertains to make and use the same.

This invention relates to new and useful improvements in shafts and particularly to joints for shafts.

The principal object of the invention is to provide a universal joint of such construction that jars and shocks will be absorbed which are due to inequalities of the running of the motor.

The present joint is especially designed for use on automobile transmission shafts for the purpose of absorbing the jars due to the unevenness in the operations of the engine.

Another object resides in the particular manner in which the joint is built and connected to the shaft ends, whereby the joint can be easily and quickly taken apart for cleaning and repairs.

A still further object resides in the provision of an oil chamber which surrounds the working parts of the joint so that said parts are at all times properly supplied with lubricant.

Other objects and advantages will be apparent from the following description when taken in connection with the accompanying drawing.

In the drawing:

Figure 1 is a side elevation of a universal joint made in accordance with the invention.

Fig. 2 is an enlarged vertical longitudinal central sectional view through the joint.

Fig. 3 is a vertical transverse sectional view through the springs and ball carried shaft, on the line 3—3 of Fig. 1.

Referring particularly to the accompanying drawing, 10 represents one portion of a transmission shaft of an automobile and 11 another portion thereof which are connected together by means of the universal joint which forms the subject-matter of this application.

Carried by the shaft section 10 is a disk 12, through which the shaft passes and is secured by means of the nut 13. Secured on the face of the disk 12 is a plate 14 in the center of the rear face of which is formed a depression 15 to receive the before-mentioned end of the shaft section 10 and the nut 13 thereon. In the center of the opposite face of the plate 14 is a circular recess 16 which receives a portion of the ball head 17 carried by the adjacent end of the shaft section 11. A retaining plate 18 is secured to the outer face of the plate 14, and has a central opening 19 through which the shaft section 11 extends, and a circular recess 20, on its inner face for the reception of the remaining portion of the ball head 17, said plate 18 being secured to the plate 14, in such firm clamping engagement with the ball head 17, as to cause the shaft sections to rotate axially with respect to each other. On the shaft section 11 is secured a disk 21 which has a circumferential shoulder or ledge 22 formed thereon, and in which are secured the adjacent end of the coil springs 23. The other ends of these springs are secured to the peripheral edge face of the plate 14, as seen in the sectional view, Fig. 2.

Secured at one end to the periphery of the disk 12, and to the periphery of the disk 21, at its other end, is a flexible sleeve 24, which may be formed from leather, or other suitable material which will retain oil. The space within which the parts work, that is the parts between the disks 12 and 21, are completely submerged in oil, thereby providing for the smooth running of the parts, and a constant supply of oil thereto at all times.

It will be noted that the disk 21 is disposed at right angles to the shaft section 11, and it will be understood that this position is at all times maintained, while the shaft sections are rotating. It will further be understood that the springs 23 expand and contract as the shaft sections turn, with the result that the contracting pull exerted by the springs at one side, simultaneously with the pull exerted by the springs at the other side, while being stretched, will have the effect of maintaining the parts in a practically rigid, yet yielding condition at all times during the rotation of the shaft.

It will also be noted that the leather sleeve 24, which retains the oil in contact with the moving parts, expands and contracts, or folds and unfolds, as the parts turn, and the disk periphery approaches and recedes with respect to the disk 14.

What is claimed is:

1. A universal joint comprising a socket member adapted for attachment to a shaft section, a shaft section having a ball head engaged in the socket of the socket member, a retaining member secured to the socket member and engaging with said ball head, a disk secured to the second-named shaft section, coil springs secured to and extending between the periphery of the disk and the socket member, and a flexible oil retaining sleeve secured to and extending between the disk and the socket member and inclosing the joint.

2. A universal joint comprising a socket member for attachment to a shaft section, a shaft section having a ball head engaged in the socket of the socket member, a retaining member secured to the socket member and engaging said ball head, a disk secured to the second named shaft section and springs secured to and extending between the periphery of the disk and the socket member and yieldably connecting them.

In testimony whereof I affix my signature in the presence of two witnesses.

JOS. P. WOOD.

Witnesses:
J. C. Evans,
J. W. Kilpatrick.